(12) United States Patent
Baldwin et al.

(10) Patent No.: US 9,329,576 B1
(45) Date of Patent: May 3, 2016

(54) WEATHERPROOF TIMER ENCLOSURE

(71) Applicant: Reliance Controls Corporation, Racine, WI (US)

(72) Inventors: Jeffrey P. Baldwin, Phoenix, AZ (US); Philip B. Baldwin, Glendale, AZ (US); John Klein, Gilbert, AZ (US); Ryan Liebengood, Gilbert, AZ (US)

(73) Assignee: Reliance Controls Corporation, Racine, WI (US)

( * ) Notice: Subject to any disclaimer, the term of this patent is extended or adjusted under 35 U.S.C. 154(b) by 216 days.

(21) Appl. No.: 14/049,603

(22) Filed: Oct. 9, 2013

Related U.S. Application Data

(60) Provisional application No. 61/711,953, filed on Oct. 10, 2012.

(51) Int. Cl.
*G04B 37/00* (2006.01)
*G04C 23/04* (2006.01)
*H01H 9/04* (2006.01)
*H01H 43/02* (2006.01)

(52) U.S. Cl.
CPC .............. *G04B 37/00* (2013.01); *G04C 23/04* (2013.01); *H01H 9/04* (2013.01); *H01H 43/022* (2013.01)

(58) Field of Classification Search
CPC ........ G04B 37/00; G04C 23/00; G04C 23/02; G04C 23/04; H01H 9/04; H01H 43/022; H02G 3/088
See application file for complete search history.

(56) References Cited

U.S. PATENT DOCUMENTS

| | | | |
|---|---|---|---|
| 2,688,366 A | 9/1954 | Morrison | |
| 2,898,993 A | 8/1959 | Huff | |
| 3,033,950 A | 5/1962 | Flegel | |
| 3,555,214 A * | 1/1971 | Lee | G04C 23/36 200/38 DA |
| 3,716,815 A * | 2/1973 | Riches | H01R 13/447 16/321 |
| 3,925,629 A * | 12/1975 | Albinger, Jr. | G04C 23/02 200/35 R |
| 4,297,546 A * | 10/1981 | Koch | H01H 43/028 200/38 D |
| 4,311,886 A | 1/1982 | Rulseh | |
| 4,381,063 A * | 4/1983 | Leong | H02B 1/066 174/67 |

(Continued)

*Primary Examiner* — Vit W Miska
(74) *Attorney, Agent, or Firm* — Boyle Fredrickson, S.C.

(57) ABSTRACT

A timer assembly housing is configured to include a number of features, including but not limited to a tortuous sealing lip, adjustable hinge assembly, removable backing plate, removable pin hinge, toggle switch, and a wiring lid. The timer assembly includes a weatherproof housing having a base with a series of sidewalls and a rear wall, the base sidewalls extending forward from the rear wall to an open front, a lid having a series of sidewalls and a front wall, the lid sidewalls extending forward from the front wall, and a timer assembly positioned within the base. The lid is selectively pivotably secured to the base along one of the base sidewalls.

20 Claims, 18 Drawing Sheets

(56) References Cited

U.S. PATENT DOCUMENTS

| | | | |
|---|---|---|---|
| 4,766,331 A | 8/1988 | Flegel et al. | |
| 4,810,897 A | 3/1989 | Shotey | |
| 4,822,964 A | 4/1989 | Koch | |
| 4,853,558 A | 8/1989 | Skarivoda | |
| 5,245,507 A * | 9/1993 | Ericksen | H02B 1/28 174/67 |
| 5,266,841 A | 11/1993 | Flegel | |
| 5,329,082 A | 7/1994 | Saarem | |
| 5,747,760 A | 5/1998 | Skarivoda | |
| D408,303 S | 4/1999 | Janda et al. | |
| D409,505 S | 5/1999 | Janda et al. | |
| 6,007,353 A * | 12/1999 | Webster | H01R 13/447 439/142 |
| D430,497 S | 9/2000 | Michaels | |
| 6,133,531 A * | 10/2000 | Hayduke | H02G 3/081 174/67 |
| 6,636,458 B1 * | 10/2003 | Uptegraph | G04B 37/1406 368/107 |
| D500,453 S | 1/2005 | Cullen et al. | |
| 6,894,223 B1 * | 5/2005 | Shotey | H02G 3/18 174/50 |
| 7,396,996 B1 * | 7/2008 | Shotey | H02G 3/14 174/481 |
| 7,396,997 B2 * | 7/2008 | Dinh | H02G 3/14 174/66 |
| 7,619,162 B2 * | 11/2009 | Dinh et al. | H01R 13/447 174/481 |
| 8,415,573 B2 | 4/2013 | Lipp et al. | |
| 2007/0290584 A1 * | 12/2007 | Dinh | H02G 3/123 312/223.6 |

* cited by examiner

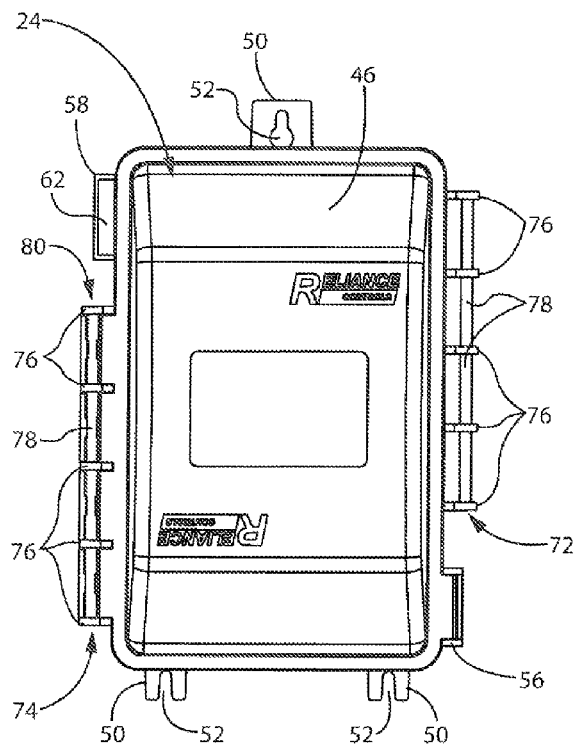
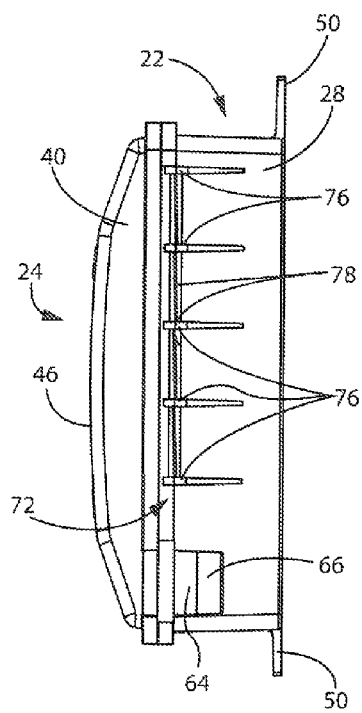
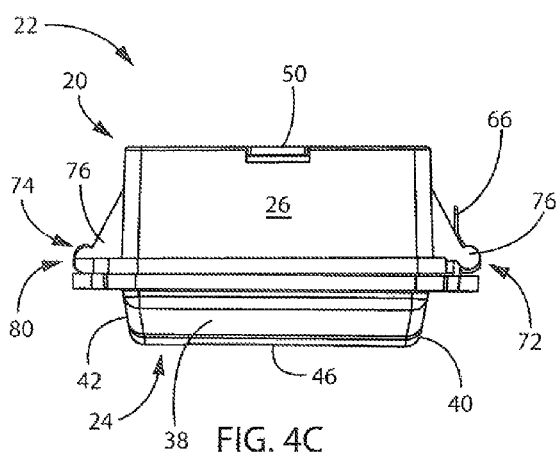
FIG 4A
FIG. 4B
FIG. 4C

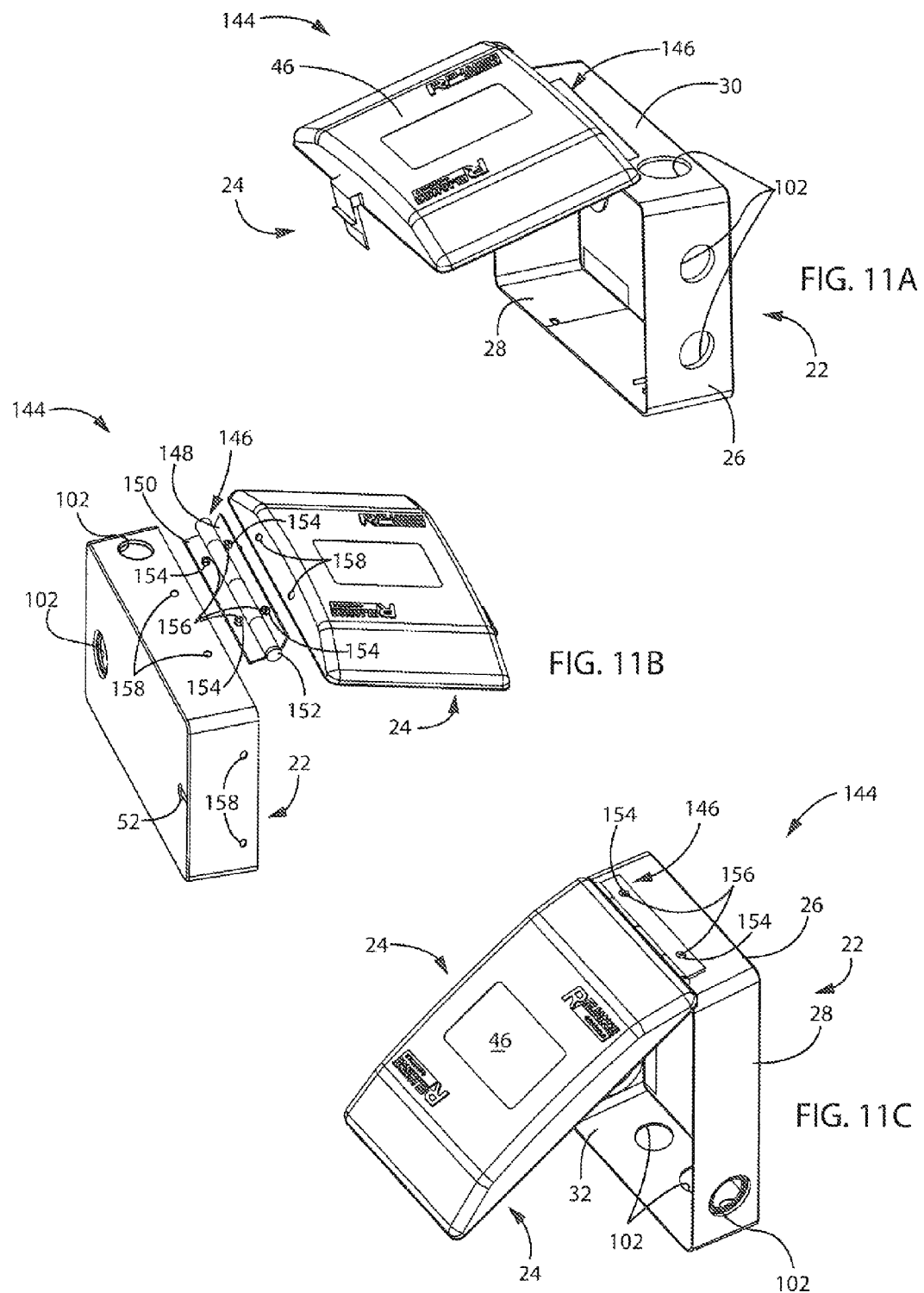

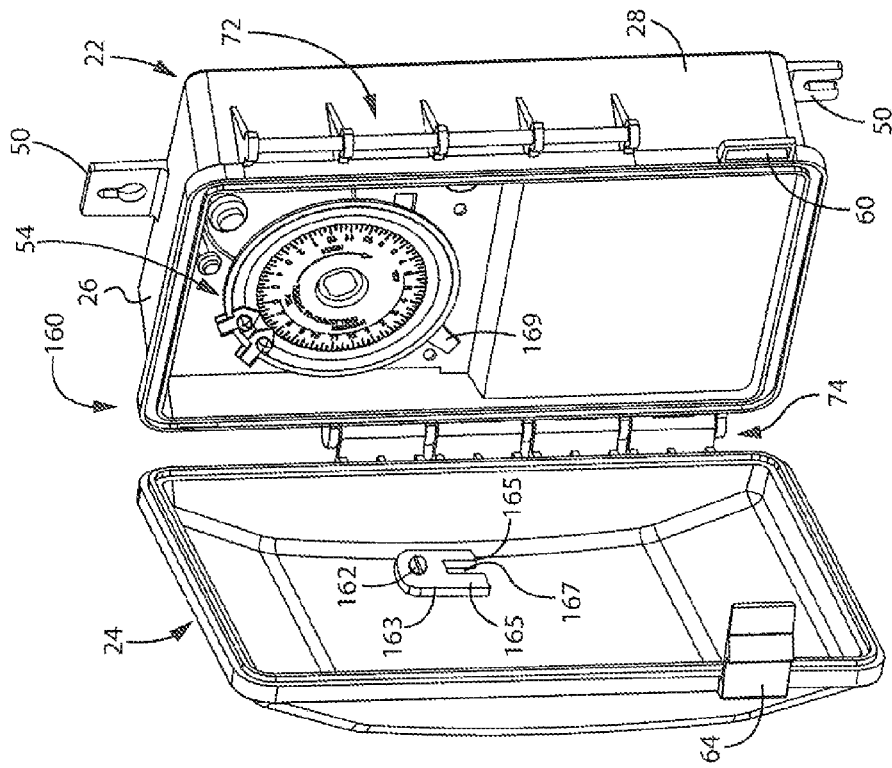
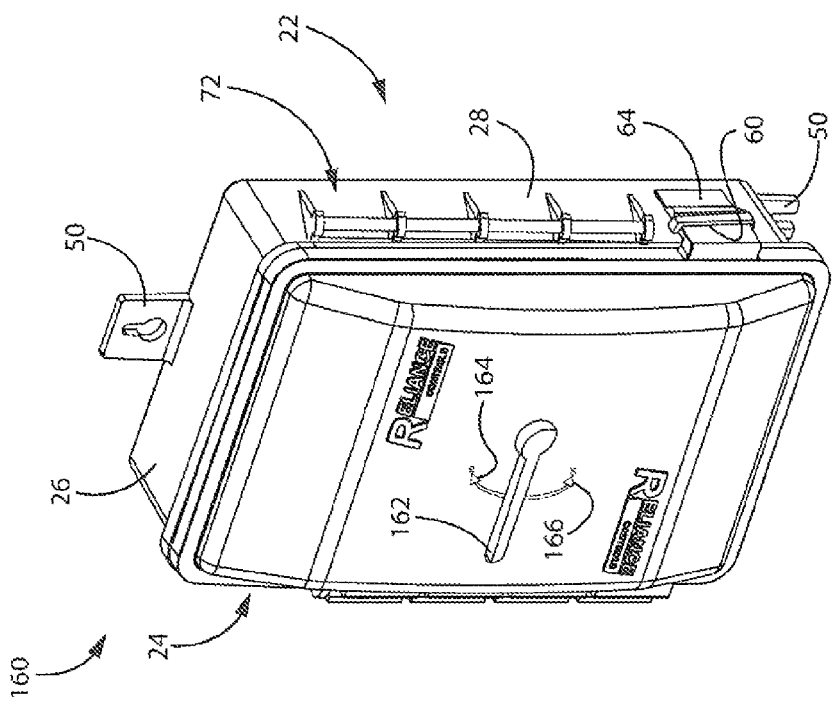
FIG. 12B
FIG. 12A

WEATHERPROOF TIMER ENCLOSURE

CROSS-REFERENCE TO RELATED APPLICATIONS

This application claims priority to U.S. provisional application Ser. No. 61/711,953, filed Oct. 10, 2012, the entire contents of which is incorporated herein by reference.

BACKGROUND OF THE INVENTION

1. Technical Field

The present invention relates generally to timing devices used in commercial, industrial and residential applications, and more particularly, an enclosure for timing devices.

2. Background Art

Timers are used for a variety of applications and purposes throughout commercial, industrial and residential buildings. Timers provide automated and adjustable control of electrical devices without having to be physically present to operate the device. Timers may be used, for example, to control pools, water heaters, lights, or any other suitable electrical component. The timers may be electrically controlled or mechanically controlled, with the mechanical variety having several trippers which operate to turn on and off the electrical component at the desired time. Since a timer is adjustable, the control mechanisms must be accessible from wherever the timer is mounted. The timer enclosures are generally mounted to a wall or post nearby the electrical device they are meant to control.

The present invention seeks to improve upon the prior art by providing a timer with a weatherproof enclosure construction having a number of different features.

SUMMARY OF THE INVENTION

The present invention is generally directed to a timer with a weatherproof timer enclosure. In particular, the present invention is directed to a weatherproof timer assembly enclosure including, but not limited to a tortuous sealing lip, an adjustable hinge assembly, a removable backing plate, a removable pin hinge, a toggle switch, and a wiring lid.

In one embodiment, a weatherproof housing for a timer includes a base having a plurality of sidewalls and a rear wall, the base sidewalls extending forward from, the rear wall to an open front, a lid having a plurality of sidewalls and a front wall, the lid sidewalls extend rearward from the front wall, and a timer assembly positioned within the base, wherein the lid is selectively pivotably secured to the base along one of the base sidewalls.

In one aspect, the weatherproof housing base sidewalls may further include a hinge member on at least one base sidewall. The hinge member may be at least two hinge members. Each of the at least two hinge members may be positioned on parallel base sidewalls.

In another aspect, the weatherproof housing may further include a releasable locking tab on the lid to engage a locking slot in the base. The lid may be selectively removable along two parallel base sidewalls and the releasable locking tab may engage the locking slot in either orientation.

In another aspect, the weatherproof housing may further include a releasable locking tab on the base to engage a locking slot in the lid.

In another aspect, the lid may be removable and replaceable in at least two different orientations.

In another aspect, the weatherproof housing may further include a wiring cavity in the base and a wiring cavity lid operable to enclose wiring between the base and the wiring cavity lid. A plurality of wiring terminals may be positioned within the wiring cavity and may be inaccessible when the wiring cavity is closed by the wiring cavity lid. The weatherproof housing may further include a switch which prevents operation of the timer when the wiring cavity is open.

In another aspect, the weatherproof housing may further include at least one removable pin connecting the base and the lid. The lid may be capable of being oriented on the base in at least two orientations.

In another aspect, the base may further include a removable insert, and the removable insert may be the base rear wall. The insert may also be replaceable.

In another aspect, the base sidewalls may further include a plurality of removable plugs in a plurality of apertures for receiving electrical wiring through the plurality of apertures. The removable plugs may be selectively replaceable.

In another aspect, the weatherproof housing may further include a lever extending through the lid and operating a user override power switch.

In another aspect, the timer assembly may be visible when the lid is in a closed position. The lid may be composed of a transparent material.

In another aspect, the weatherproof housing may further include a serpentine or tortuous path along a sealing point between the base and the lid.

In yet another aspect, the base may further include at least two hinge members, each of the at least two hinge members positioned on different base sidewalls, and wherein the lid further comprises at least one hinge member selectively securable to either of the at least two base hinge members. One of the at least two base hinge members is a non-connected hinge member and is not connected to the lid at least one hinge member, and wherein the non-connected hinge member is removable from the base. The lid is rotated 180 degrees to attach the lid to the base at the other of the at least two base hinge members.

In an alternative embodiment, a weatherproof housing includes a base having a plurality of sidewalls and a rear wall, the base sidewalls extending forward from the rear wall to an open front, a lid having a plurality of sidewalls and a front wall, the lid sidewalls extending rearward from the front wall wherein the lid is selectively pivotably secured to the base along one of the base sidewalls, a timer assembly positioned within the base, and a wiring lid positioned in the base to limit access to at least one portion of a base cavity between the plurality of base sidewalls wherein the wiring lid is selectively pivotable to permit access to the at least one portion of the base cavity.

In one aspect, the wiring lid is pivotably secured to the base within a wiring cavity for receiving electrical wiring therein. The wiring lid may limit access to the wiring cavity when in a closed position, and permits access to the wiring cavity when the lid is in an open position.

In another aspect, the wiring lid may further include at least one latch.

In another aspect, the lid may further include a closure member engageable with a hinge. The closure member may be selectively engageable with a hinge connecting member to maintain the lid in a closed position.

In another aspect, the base further comprises a locking latch on the lid and a locking tab on the base.

Various other features, objects and advantages of the present invention will be apparent from the following detailed description taken together with the drawings.

BRIEF DESCRIPTION OF THE DRAWINGS

The drawings illustrate the best mode presently contemplated for carrying out the invention.

In the drawings:

FIG. 4A is a front elevation view of the weatherproof timer enclosure of FIG. 1 with the lid closed;

FIG. 4B is a side elevation view of the weatherproof timer enclosure of FIG. 1 with the lid closed;

FIG. 4C is a top plan view of the weatherproof timer enclosure of FIG. 1 with the lid closed;

FIG. 11A is an isometric view of an alternative embodiment of the weatherproof timer enclosure in accordance with the present invention showing the weatherproof timer enclosure with a removable hinge subassembly attached to a long edge of the base;

FIG. 11B is an isometric view of the weatherproof timer enclosure of FIG. 11A showing the removable hinge subassembly and lid removed and separated from the base;

FIG. 11C is an isometric view of the weatherproof timer enclosure of FIG. 11A with the removable hinge subassembly attached to a short edge of the base;

FIG. 12A is an isometric view of an alternative embodiment of the weatherproof timer enclosure in accordance with the present invention showing the weatherproof timer enclosure with an operable user override switch accessible from an exterior of the lid;

FIG. 12B is an isometric view of the weatherproof timer enclosure of FIG. 12A with the lid open;

DETAILED DESCRIPTION OF THE DRAWINGS

Figure 1:
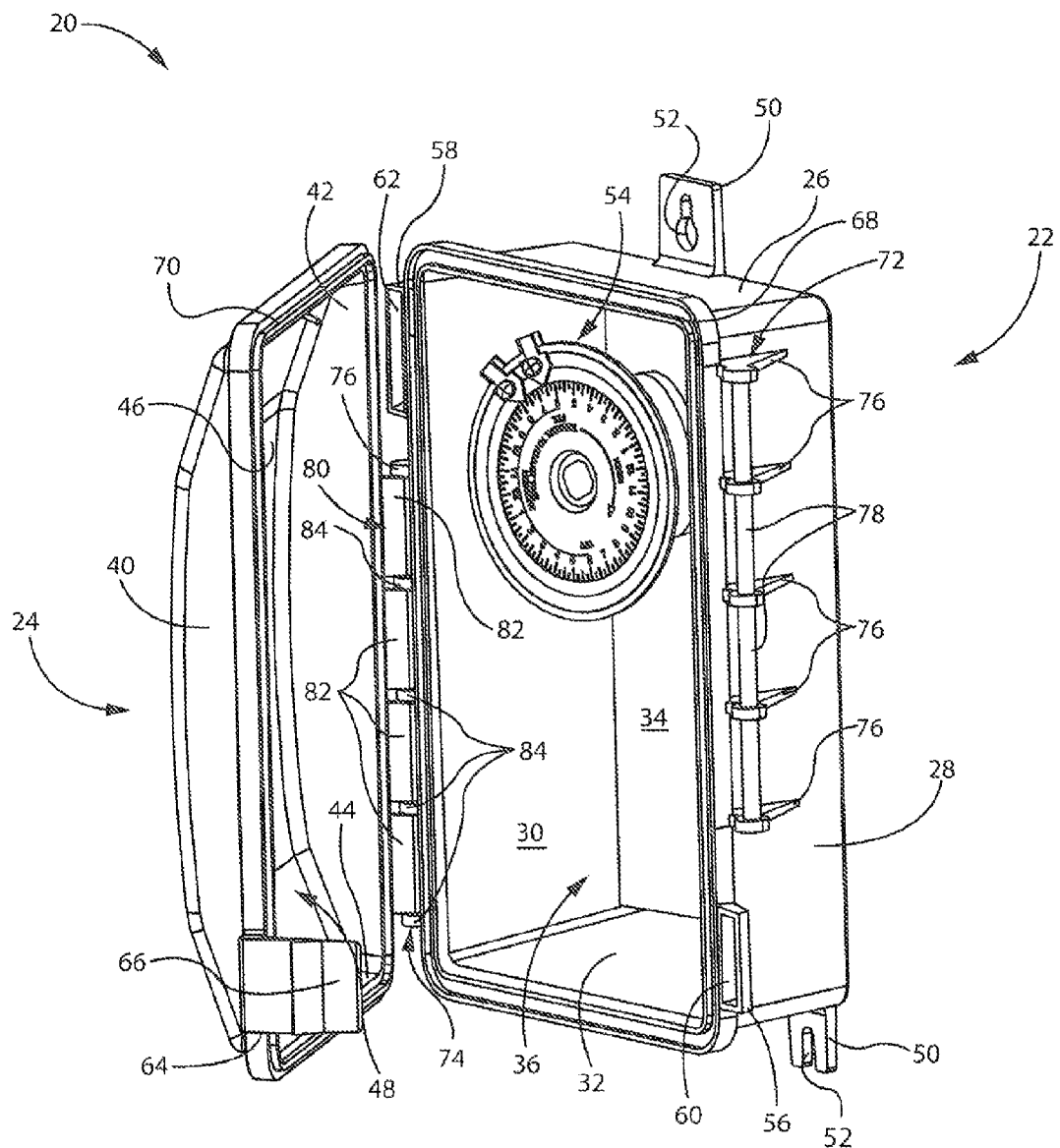
FIG. 1 is an isometric view of a weatherproof timer enclosure of the present invention showing a lid opened and selectively hinged on a left side of a base, and a timer assembly installed therein.
Figure 2:
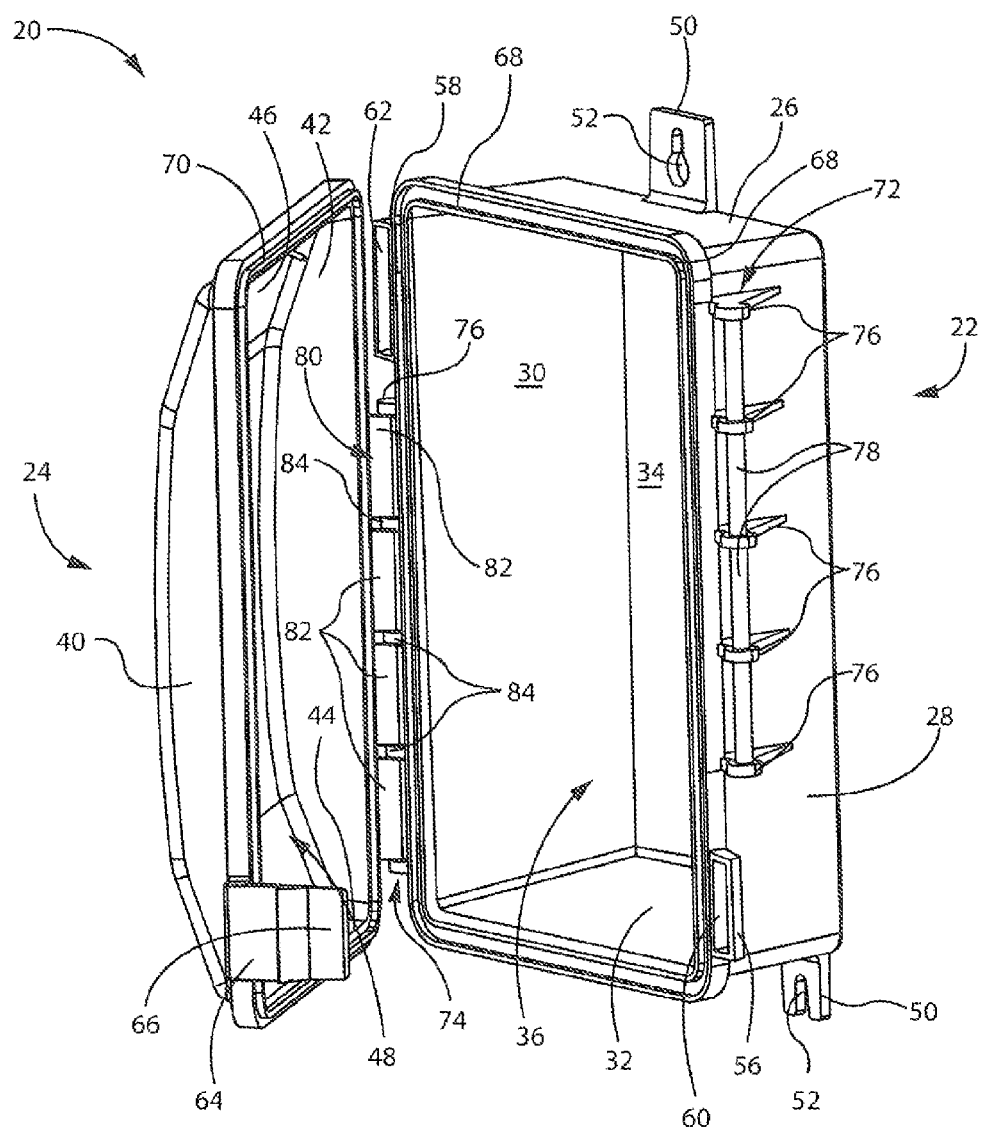
FIG. 2 is an isometric view of the weatherproof timer enclosure of FIG. 1 showing the timer assembly removed.
Figure 3:
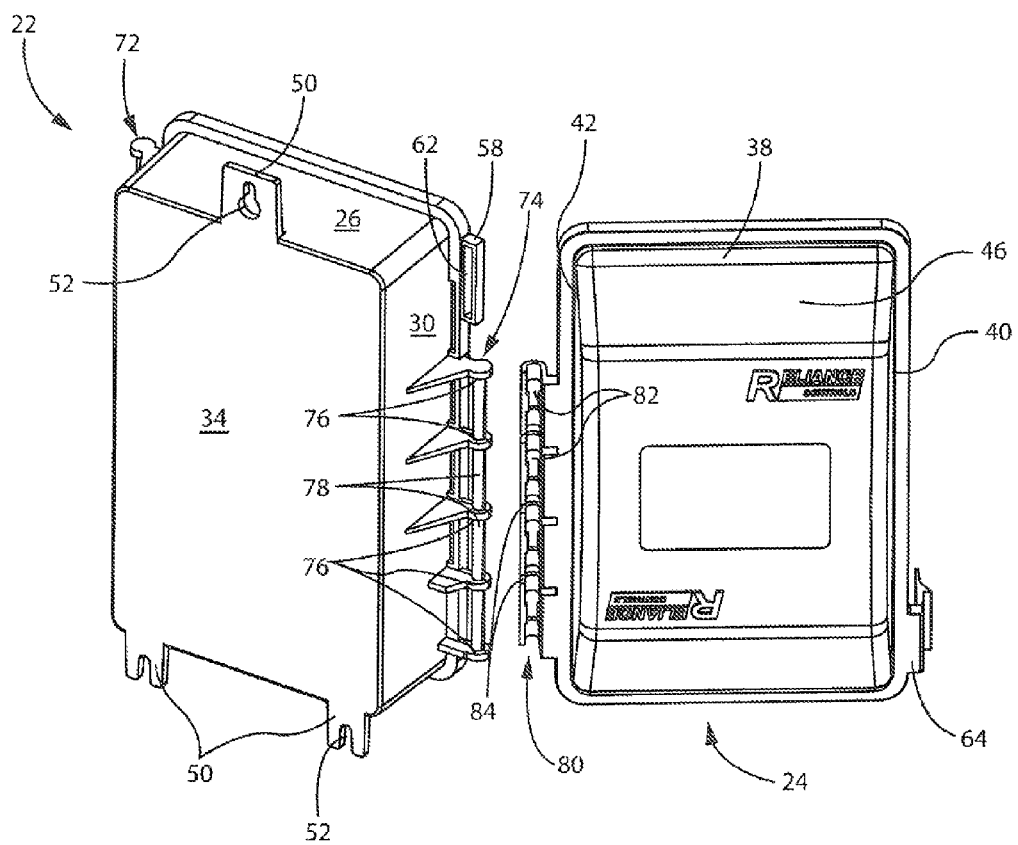
FIG. 3 is an isometric view of the weatherproof timer enclosure of FIG. 1 showing the rear of the enclosure with the lid detached from the base.
Figure 5:
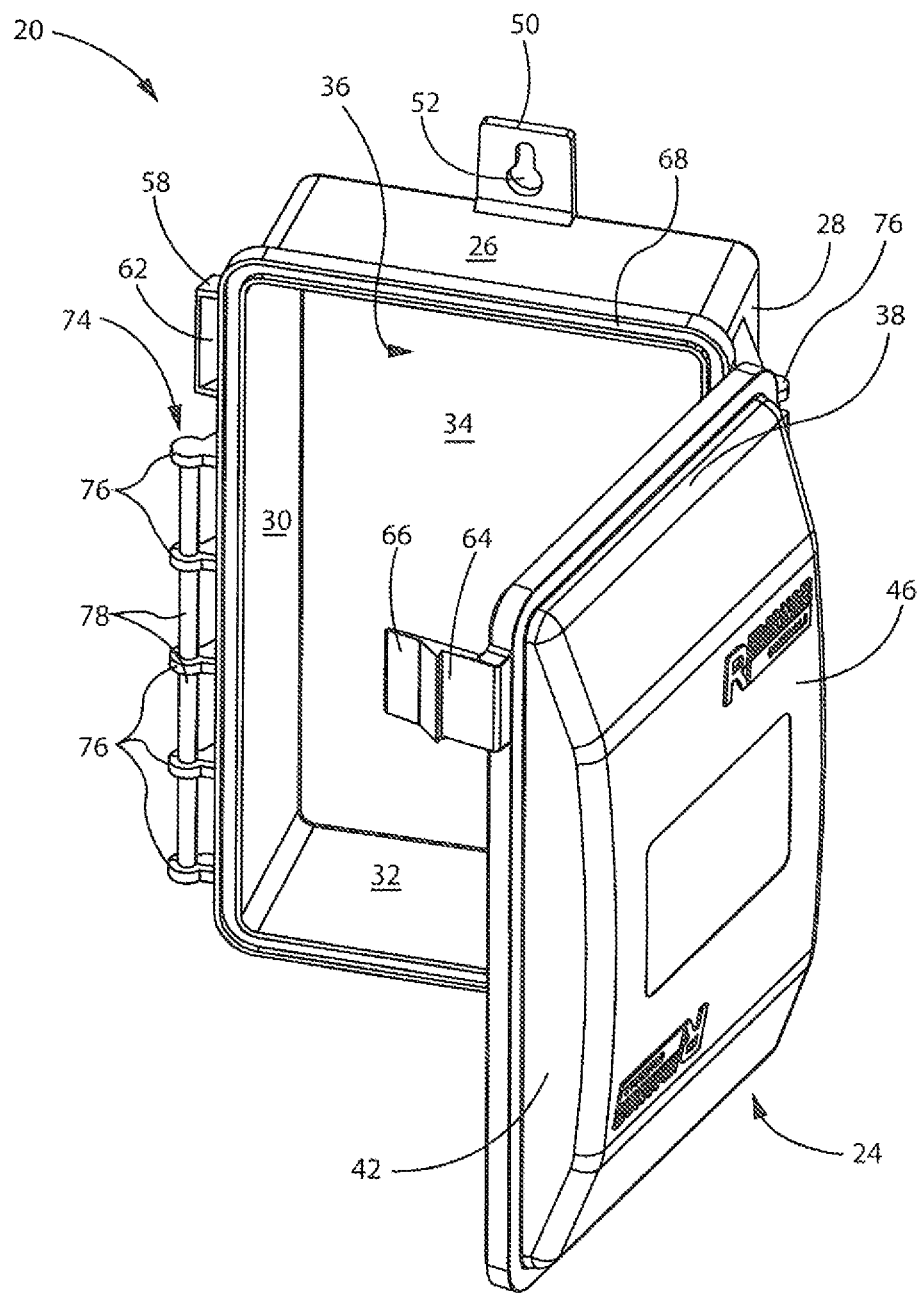
FIG. 5 is an isometric view of the weatherproof timer enclosure of FIG. 1 showing the lid opened and selectively hinged on a right side of the base, and the timer assembly removed.

This invention relates to a weatherproof timer assembly enclosure having a number of different features, which may be employed separately or in various combinations or subcombinations.

FIGS. 1-5 illustrate a weatherproof timer enclosure 20 in accordance with the present invention having a base 22 and a lid 24. The base 22 includes a series of sidewalls, including a top side wall 26, a right sidewall 28, a left sidewall 30, and a bottom sidewall 32. The base sidewalls 26, 28, 30, 32 extend forward from a back wall 34 and together at least partially define a base cavity 36. The lid 24 also includes a series of sidewalls, including a top sidewall 38, a right sidewall 40, a left sidewall 42, and a bottom sidewall 44. The lid sidewalls 38, 40, 42, 44 extend from a lid front wall 46 and together at least partially define a lid cavity 48. Both cavities 36 and 48 extend inwardly from an open front between their respective sidewalls to the respective back wall 34 or front wall 46.

Referring to FIGS. 1-5, the base 22 may also include mounting tabs 50 with mounting openings 52 therein to secure the base 22 to an object such as a wall, post, or other suitable surface of virtually any size or shape. As seen in FIG.

1, a timer assembly 54 is positioned within the base cavity 36 and may extend into the lid, cavity 48. The timer assembly 54 may include any variety of timer components, including any suitable mechanical timer or an electrical or electronic timer. Still further, mechanical timer mechanisms are not in any way limited to known timer assemblies and could also be removed and replaced within the weatherproof timer enclosure 20 as components wear out or are found to be defective.

The base 22 may also include a first base closure tab 56, a first base closure tab opening 60, a second base closure tab 58, and a second base closure tab opening 62. The lid 24 includes a lid closure member 64 with a lid closure member protrusion 66 which is complementary shaped and aligned to fit within either the first base closure tab opening 60 or the second base closure tab opening 62 depending on the orientation selected by the installer, as will be described. The base 22 also includes a peripheral sealing lip 68, while the lid includes a peripheral sealing lip 70, with the sealing lips 68, 70 fitting together to limit and/or prevent liquid or other contaminants from entering the weatherproof enclosure. Further, either or both of the sealing lips 68 and 70 may define a serpentine or tortuous path to assist in further limiting liquids from penetrating the weatherproof enclosure.

The base 22 also includes a first hinge 72 on the right sidewall. 28 and a second hinge 74 on the left sidewall 30. In one implementation, the base hinges 72 and 74 are each positioned near a front surface of the cavity 36 and the peripheral sealing lip 68. Each of the hinges 72 and 74 may consist of a plurality of binge supports 76 and hinge connecting members 78, with the hinge connecting members 78 located between respective hinge supports 76. The hinge supports 76 extend backwards towards the adjacent sidewall and space each of the hinges outwardly away from the sidewalls. As can be seen in the drawings, there may be two hinges, one hinge on the left side and one on the right side, but it is within the spirit and scope of the present invention to provide base hinges on the top and bottom sidewalls to provide similar functionality. Further, the first and second hinges 72 and 74, respectively, may be selectively removable from the respective sidewall by a twisting and/or pulling connection or may be permanently secured with a press fit or other suitable non-removable connection mechanism.

The lid 24 includes a lid hinge 80 having a hinge channel 82 and hinge breaks 84 within the channel 82. The hinge channel 82 is generally U-shaped or semi-circular in shape with the breaks 84 positioned evenly along the length of the lid hinge 80. In one implementation, the lid 24 includes at least one lid hinge 80 on a sidewall, but another lid hinge 80 may be incorporated on two or more sidewalls. When only a single lid hinge 80 is incorporated, the lid hinge 80 is advantageously positioned to permit the lid hinge to selectively mate with either of the base hinges 72 or 74, and the lid 24 may be disconnected by the installer/user and reversed to connect to the base on the opposite sidewall.

Specifically, the hinge breaks 84 are aligned with the hinge supports 76 and permit the hinge supports 76 to pass through the breaks 84, thereby allowing the lid 24 to pivot between open and closed positions. Further, the channel 82 at least partially surrounds the hinge connecting members 78 and may be selectively connected to the base 22 at either base hinge 72 or 74. The hinge channel 82 is complementary shaped to surround at least a portion of the connecting members 78 and may be a similar size as the connecting members 78 such that the hinge channel 82 is slightly flexible to secure the lid to the base while still permitting the lid to rotate at the hinge connections.

As can be seen in FIGS. 1-5, the base 22 and the lid 24 may be connected at either of the hinges 72 or 74 with the lid hinge 80. Regardless of which orientation of the weatherproof timer enclosure is selected, the lid closure member 64 and particularly the lid closure member protrusion 66 are inserted into a corresponding base closure tab opening 60 or 62 depending on the orientation. Thus, it is seen that a variety of orientations and arrangements may be utilized to provide a weatherproof timer enclosure with user selected lid pivoting orientations.

The base 22 and lid 24 may be composed of any suitable material, including any plastic, metal, or other material and may be provided in any color, clear, or paintable. Although FIGS. 1-5 do not illustrate openings for wiring to enter the base 22, a person of ordinary skill in the art will immediately appreciate that holes or knockouts may be located anywhere in the base 22 for receiving the wiring therein, in a manner as is known.

Figure 6:
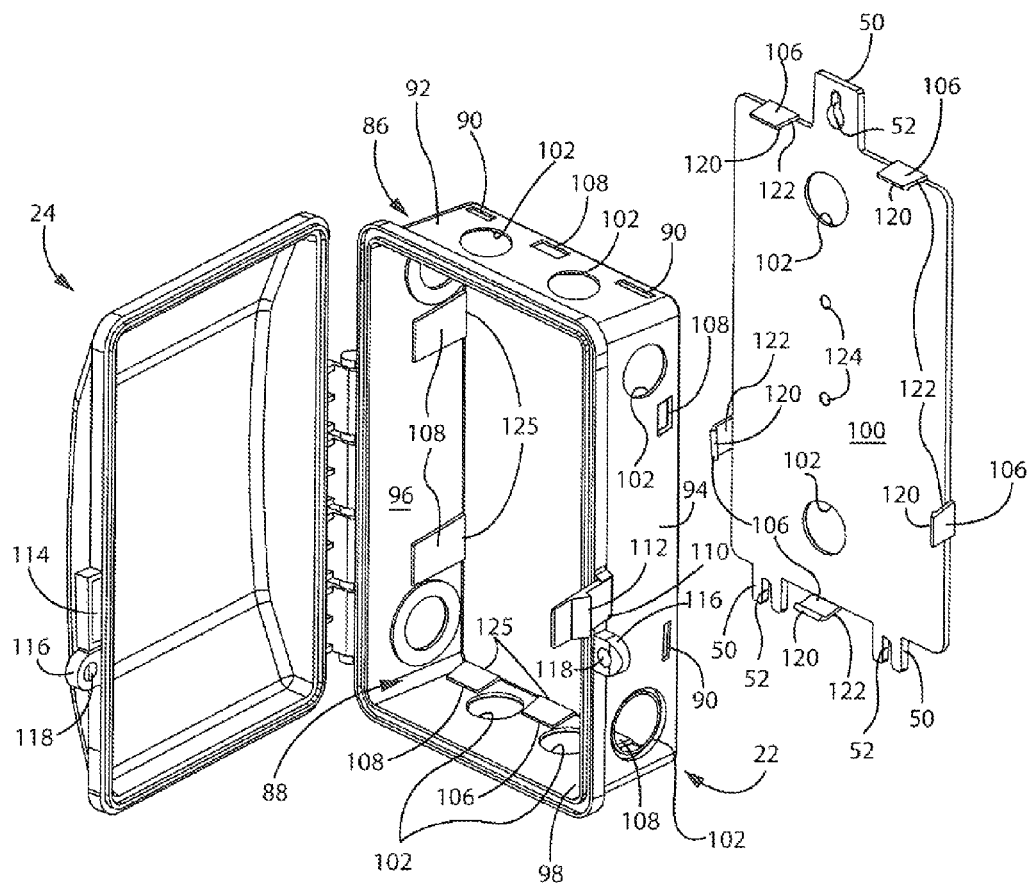
FIG. 6 is an isometric view of an alternative embodiment showing a weatherproof timer enclosure in accordance with the present invention with a lid selectively hinged on a left side of a base, and a backing plate shown separated from the base.
Figure 7:
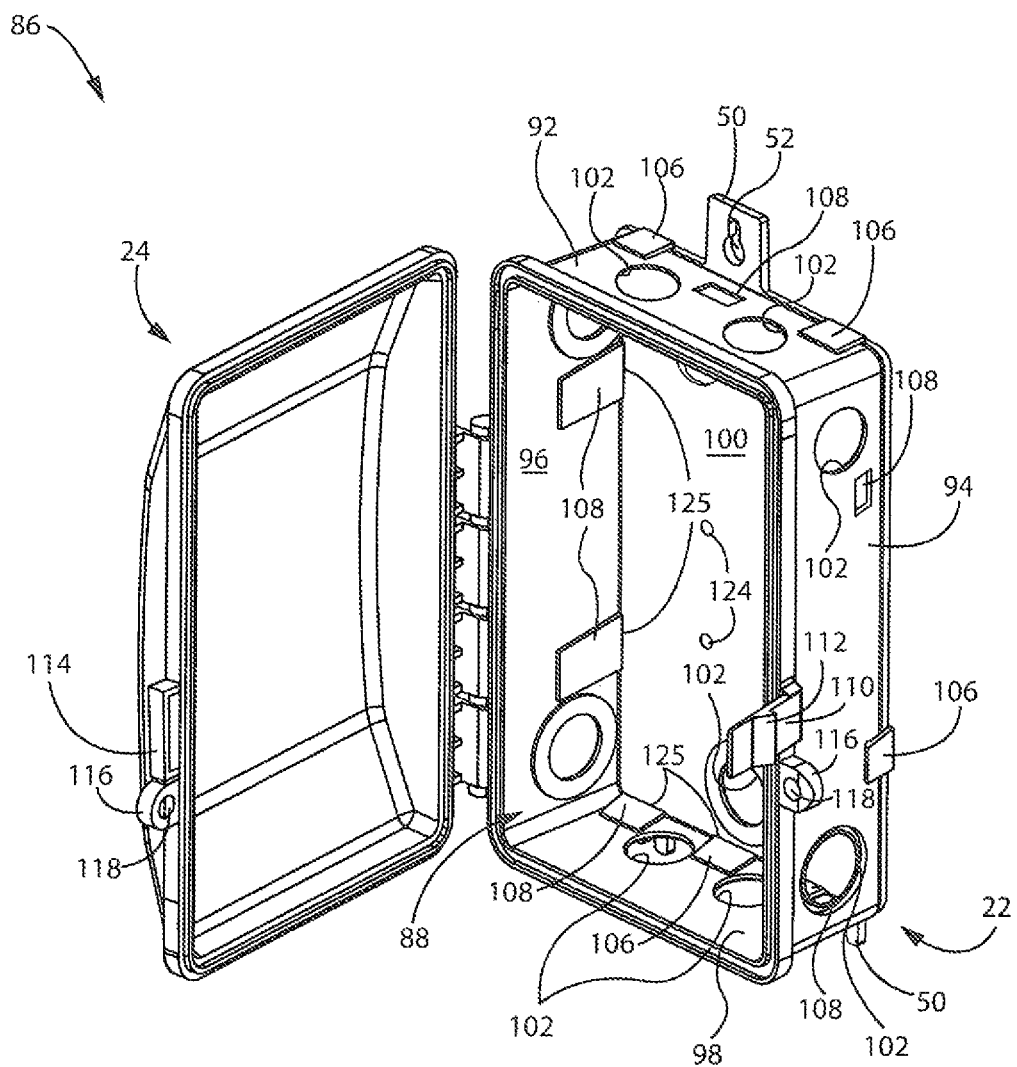
FIG. 7 is an isometric view of the weatherproof timer enclosure of FIG. 6 with the backing plate coupled to the base and showing a plurality of apertures for receiving wiring therethrough.
Figure 8:
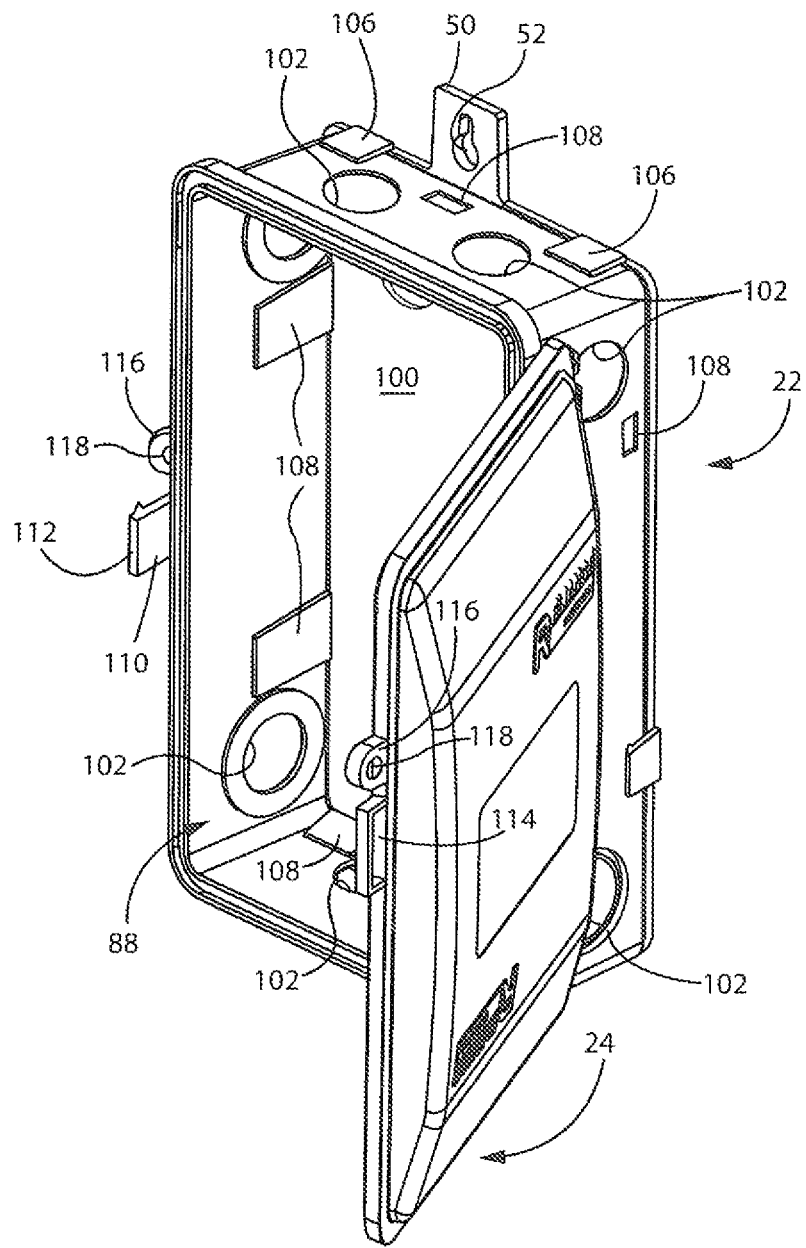
FIG. 8 is an isometric view of the weatherproof timer enclosure of FIG. 6 with the lid selectively hinged on a right side of the base, and the backing plate coupled to the base.

FIGS. 6-8 illustrate an alternative embodiment weatherproof timer enclosure 86 in accordance with the present invention having a base 22 and a lid 24. In this version, the base 22 includes a top sidewall 92, a right sidewall 94, a left sidewall 96, and a bottom sidewall 98. Similar to the first embodiment, the base sidewalls extend forward to an open front and define a cavity 88, in combination with a backing plate 100. As seen in FIG. 6, the backing plate 100 is shown separated from the base 22. As seen in FIGS. 7-8, the backing plate 100 is removably secured to the back side of the base sidewalls. The base 22 also includes mounting tabs 50 with mounting apertures 52.

Referring to FIGS. 6-8, the base sidewalls 92, 94, 96, 98 and backing plate 100 include a series of wiring apertures 102 which may include removable plugs (not shown) that may include screw-like mating arrangements between the removable plugs and the apertures 102. Further, the wiring apertures 102 may include rubber grommets (not shown) or other suitable blocking structures which completely fill the apertures 102 when a piece of wire is not present and also surround a wire when present to prevent water or other contaminants from entering the weatherproof enclosure.

The backing plate 100 includes a series of exterior backing plate tabs 106 which may be located at any suitable location on the backing plate, for example on the top edge, the right edge, the bottom edge, and the left edge. The base 22 may include a series of interior support members 108 within the cavity 88 to prevent the backing plate 100 from extending into the cavity 88. Further, interior support members 108 allow firm positioning of the backing plate 100 between the exterior backing plate tabs 106 and the interior support members 108. The support members 108 may also define the support surfaces or walls 125 which function to limit inward movement of the backing plate 100 within the cavity 88. The base 22 may also include a closure member 110 extending forwardly from the base 22 and having a closure member protrusion 112 for securing the lid 24 in a closed position. Specifically, the lid 24 includes a closure member receiving slot 114 to receive the closure member 110 and the closure member protrusion 112 to secure the lid 24 and the base 22 in a closed position, while allowing the user to manipulate the closure member protrusions 112 to permit opening of the lid 24 and access to the timer assembly 54.

The base 22 and lid 24 may each include a locking member 116 with a locking member aperture 118 therein. In one implementation, the locking member apertures 118 of the base 22 and lid 24 align with one another to receive a lock or other securing device (not shown) therein to selectively limit access to the timer assembly 54.

The exterior backing plate tabs 106 each include a backing plate protrusion 120 for securing the backing plate 100 to the base 22 and a backing plate spacer 122 to position the protrusion 120 within a base backing plate mount 90. In one aspect, the base backing plate mounts 90 are positioned on the outside of the base sidewalls and allow backing plate protrusions 120 to slightly flex along the sidewalls during installation and removal but remain generally flat once the protrusions 120 are seated within the backing plate mounts 90. Further, the backing plate 100 is more easily removable since a user can simply separate the backing plate tabs 106 from the base sidewalls and thereby remove the protrusions 120 from the backing plate mounts 90. In another aspect, not shown, protrusions similar to the protrusion 120 may extend from the base 22 and into mounts within the backing plate 100.

The backing plate 100 may also include a series of mounting apertures 124 to secure the base 22 and backing plate 100 to an object such as a wall or pole. In another implementation, the base 22 may also include mounting apertures (not shown) which align with the mounting apertures 124 to ensure that both the base 22 and the backing plate 100 are secured together. Similar to other implementations, the weatherproof enclosure 86 may include a sealing lip and any other suitable features disclosed in other aspects and implementations herein. This embodiment also contemplates attachment of the lid 24 on any side of the base 22, for example, on a left side (as seen in FIGS. 6-7) or a right side (as seen in FIG. 8) as desired. A person skilled in the art will immediately appreciate that a number of suitable changes may be incorporated as disclosed herein.

In this embodiment, in which the backing plate 100 is formed separately from side walls 92, 94, 96, 98, there is a great deal of flexibility in the manner in which the base 22 may be constructed. For example, a number of different backing plates may be provided, each having, for example, a different mounting configuration or a different number and/or pattern of knockout openings. Similarly, a number of different side wall assemblies may be provided, each having, for example, a different location, number or configuration of knockout openings, hinge configurations, latching configurations, etc. The manufacturer or end user may select and then connect together a certain one of the side wall assemblies with a certain one of the backing plates to provide a base 22 having a desired construction and configuration.

Figure 9:
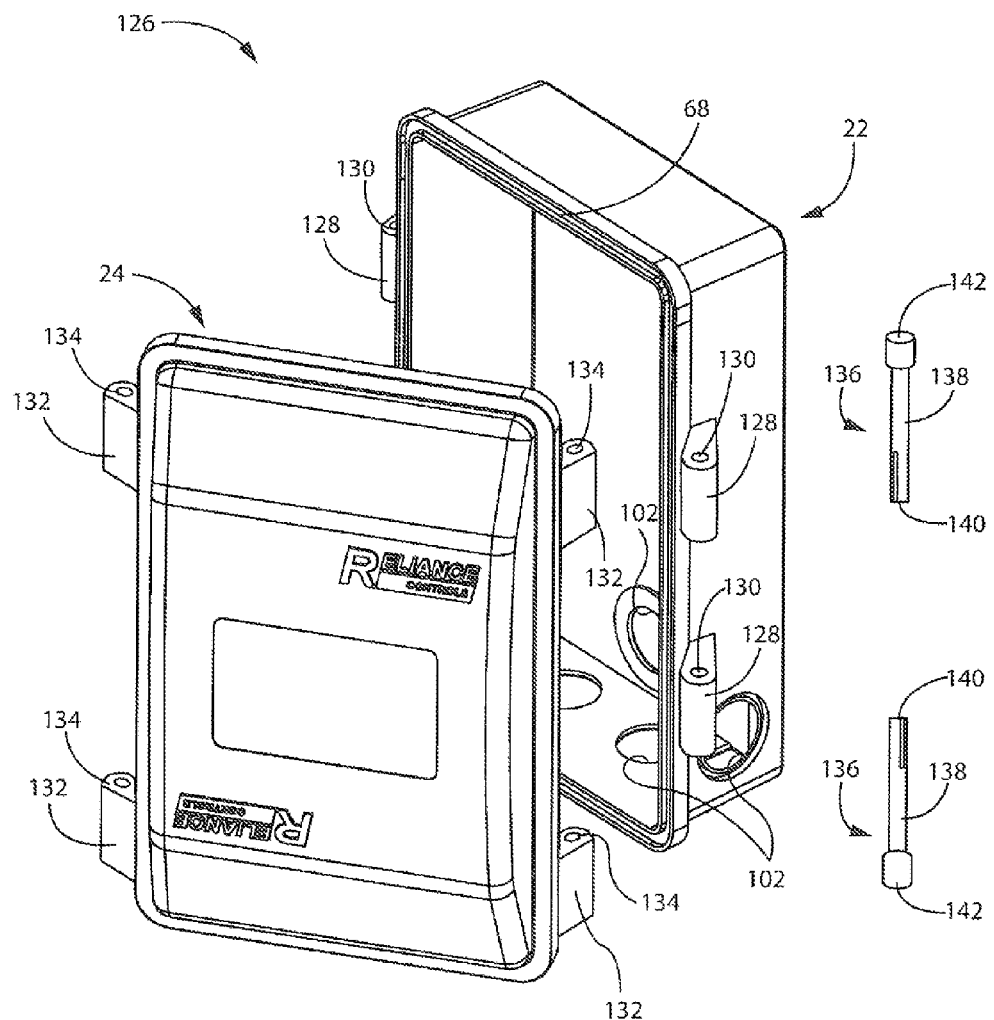
FIG. 9 is an isometric view of an alternative embodiment of the weatherproof timer enclosure in accordance with the present invention showing the weatherproof timer enclosure with the lid removed and pins exploded from their pin hinges.
Figure 10B:
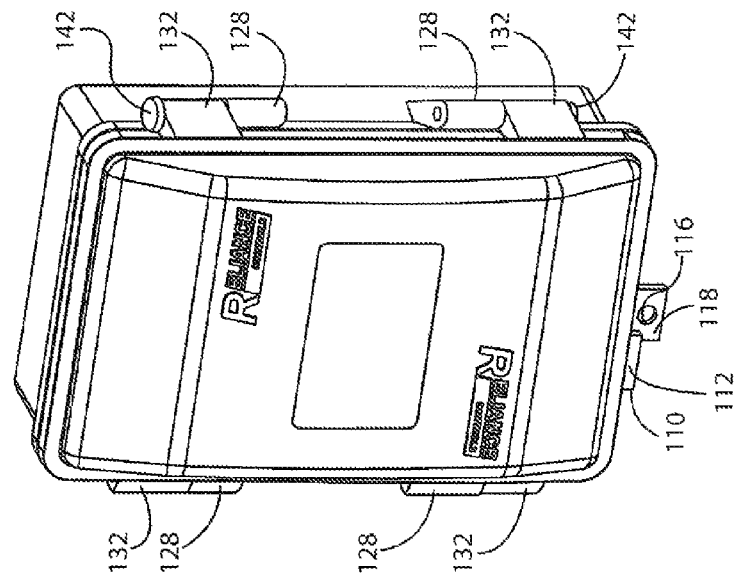
FIG. 10B is an isometric view of a weatherproof timer enclosure of FIG. 9 with the pins selectively inserted in the pin hinges on the right side of the base.

FIGS. 9-10B illustrate another implementation of a weatherproof timer enclosure 126 in accordance with the present invention having a removable pin hinge feature. Specifically, the base 22 includes a pair of base pin hinges 128, each having a base hinge aperture or passage 130 extending therethrough. The lid 24 also includes a pair of lid hinges 132, each having a lid hinge aperture or passage 134 extending therethrough. A pair of hinge pins 136 are arranged to extend though the selected passages to selectively determine which direction the lid 24 pivots (depending on which side of the base 22 and lid 24 are hinged or pinned together). For example, if the base 22 and lid 24 are pinned on the right side, the lid 24 will open from the left to the right, while if the base 22 and lid 24 are pinned on the left side, the lid 24 will open from the right to the left. Similarly, this implementation can be incorporated to be on a top and bottom of the base 22 and lid 24 to provide a pin hinge arrangement which opens from the bottom upwards or from the top downwards.

Each pin 136 may include a pin shaft 138, a pin lock 140, and a pin head 142. The pin head 142 may be positioned generally opposite the pin lock 140. The pin lock 140 may be any suitable lock and in one implementation it is a pair of legs with a gap therebetween to selectively secure the pins 136 within hinge passages as desired.

Figure 10A:
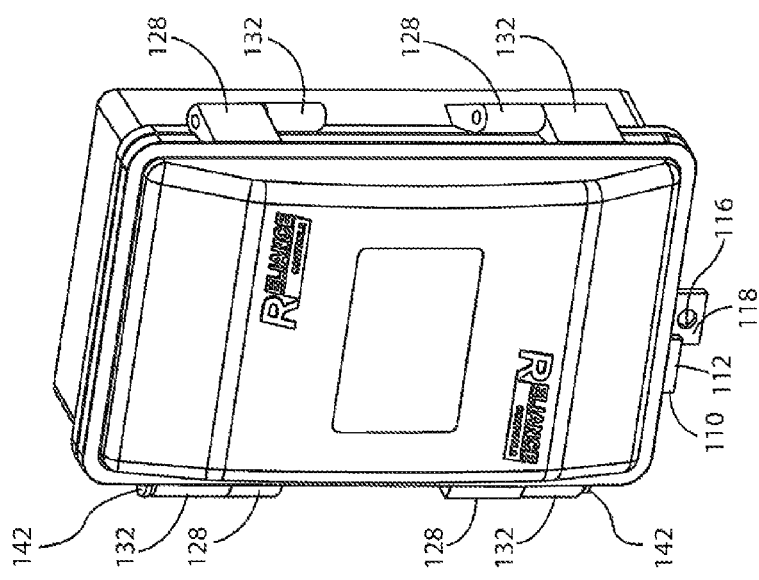
FIG. 10A is an isometric view of the weatherproof timer enclosure of FIG. 9 with the pins selectively inserted in the pin hinges on the left side of the base.

As can be specifically seen in FIGS. 10A and 10B, a number of suitable arrangements may be created to allow the enclosure to open in a selected direction to fit restricted access spaces, such as in a corner or near other objects. Still further, the pin lock 140 may be oriented to permit the user to selectively remove the pins and re-orient the lid and base positioning. Finally, the unused pin hinges 128, 132 on the base 22 and lid 24, respectively, may be removed to further streamline the enclosure after installation. In yet another implementation, the removed pin hinges 128, 132 may be discarded or reinstalled to reorient the lid opening direction.

Still referring to FIGS. 10A and 10B, the pin hinges 128 of the base 22 may each be positioned to be inward of the pin hinges 132 of the lid 24. In other words, the pin hinges 128 may be positioned closer to a vertical centerline of the base 22 than pin hinges 132 of the lid 24 in one implementation. Further, since there are two sets of pin hinges 132 on each side and two sets of pin hinges 128 on each side, the pin hinges are preferably offset from one another so that they can freely and easily open and close. While the present implementations are shown and described with the pin hinges 128 inward of pin hinges 132, the orientation and arrangement may be reversed so that the pin hinges 128 are outward of pin hinges 132 without departing from the spirit and scope of the present disclosure.

As in the previous implementation, the base 22 may also include a closure member 110 extending forwardly from the base 22 and having a closure member protrusion 112 for securing the lid 24 in a closed position. The lid 24 includes a closure member receiving slot 114 to receive the closure member 110 and the closure member protrusion 112 to secure the lid 24 and base 22 in a closed position, while allowing the user to manipulate the closure member protrusions 112 to permit opening of the lid 24 and access to the timer assembly 54. The base 22 and lid 24 may each include a locking member 116 with a locking member aperture 118 therein.

FIGS. 11A, 11B, and 11C illustrate another aspect of a weatherproof timer enclosure 144 in accordance with the present invention having a base 22 and lid 24 which may both be composed of plastic, sheet metal or any other suitable thin material. The lid 24 includes an adjustable hinge sub-assembly 146 to connect the base 22 and the lid 24. Specifically, the hinge sub-assembly 146 may include a first connecting member 148 and a second connecting member 150 pivotably connected at pivot member 152. Each of the first and second connecting members 148, 150 includes a pair of apertures 154 for receiving the mounting screws 156 therein. The mounting screws 156 extend through the apertures 154 and into threaded holes 158 in the base 22. The threaded holes 158 may be located in all of the base sidewalls so that the installer can selectively attach the hinge sub-assembly 146 to any of the base sidewalls to permit the lid 24 to selectively pivot in any direction. Similarly, the installer will attach the hinge sub-assembly 146 to the lid 24 by positioning the mounting screws 156 into the appropriate lid threaded holes 158. It is contemplated that the hinge sub-assembly 146 may be attached to a long edge of base 22 (as seen in FIGS. 11A and 11B) or a short edge of base 22 (as seen in FIG. 11C) as desired.

The remaining operation and features of the weatherproof timer enclosure 144 remain the same and any suitable features from other aspects and implementations may be incorporated without departing from the spirit and scope of the present disclosure. For example, the hinge sub-assembly 146 may be secured to the base 22 and lid 24 with any suitable mechanism or connection arrangement, including but not limited to screws, bolts, clips, springs, rings, magnets, adhesive and tabs.

FIGS. 12A and 12B illustrate a weatherproof timer enclosure 160 in accordance with the present invention having a toggle switch 162 operable from outside the lid 24. As seen in FIG. 12A, the toggle switch 162 is movable in the direction associated with arrow 164 to turn the timer assembly 54 on, and movable in the direction associated with arrow 166 to turn the timer assembly 54 off. As seen in FIG. 12B, the toggle switch 162 extends through an opening in the lid 24 and may be sealed along the lid 24 to prevent water and debris from entering the enclosure 160 when the lid 24 is closed.

The toggle switch 162 may operate the manual override switch, whereby the user may flip the toggle switch 162 to operate the manual override switch. In the same way, when the timer assembly 54 operates, the toggle switch 162 may move to the on or off position, as appropriate, and the user can visually determine if the timer assembly 54 is in the on or off position without opening the lid 24 or exposing the timer assembly.

The remaining components of the weatherproof timer enclosure 160 are similar to the other aspects and implementations disclosed and any suitable features or arrangements of previous aspects and implementations may be incorporated without departing from the spirit and scope of the present disclosure. For example, the selectable hinge assembly of FIGS. 1-5 is shown incorporated and the lid may be oriented to open in any suitable direction.

FIG. 12B further illustrates the enclosure 160 and particularly the toggle switch 162 connected to a switch fork 163. The switch fork 163 includes a pair of actuating legs 165 with a receiving opening 167 arranged to receive the user manual override switch 169 of the timer assembly 54 therein. Specifically, the user manual override switch 169 is rotatable with the switch fork 163 at the actuating legs 165. Thus, when switch fork 163 rotates, the respective actuating legs 165 contact the user manual override switch 169 to move the switch 169 to the on or off position as appropriate. Finally, when the toggle switch 162 is moved towards the on or off position outside of lid 24, the user manual override switch 169 also contacts the actuating legs 165. In the same manner, when toggle switch 162 is operated, the switch fork 163 rotates and contacts user manual override switch 169 to operate the timer assembly 54.

Figure 13:
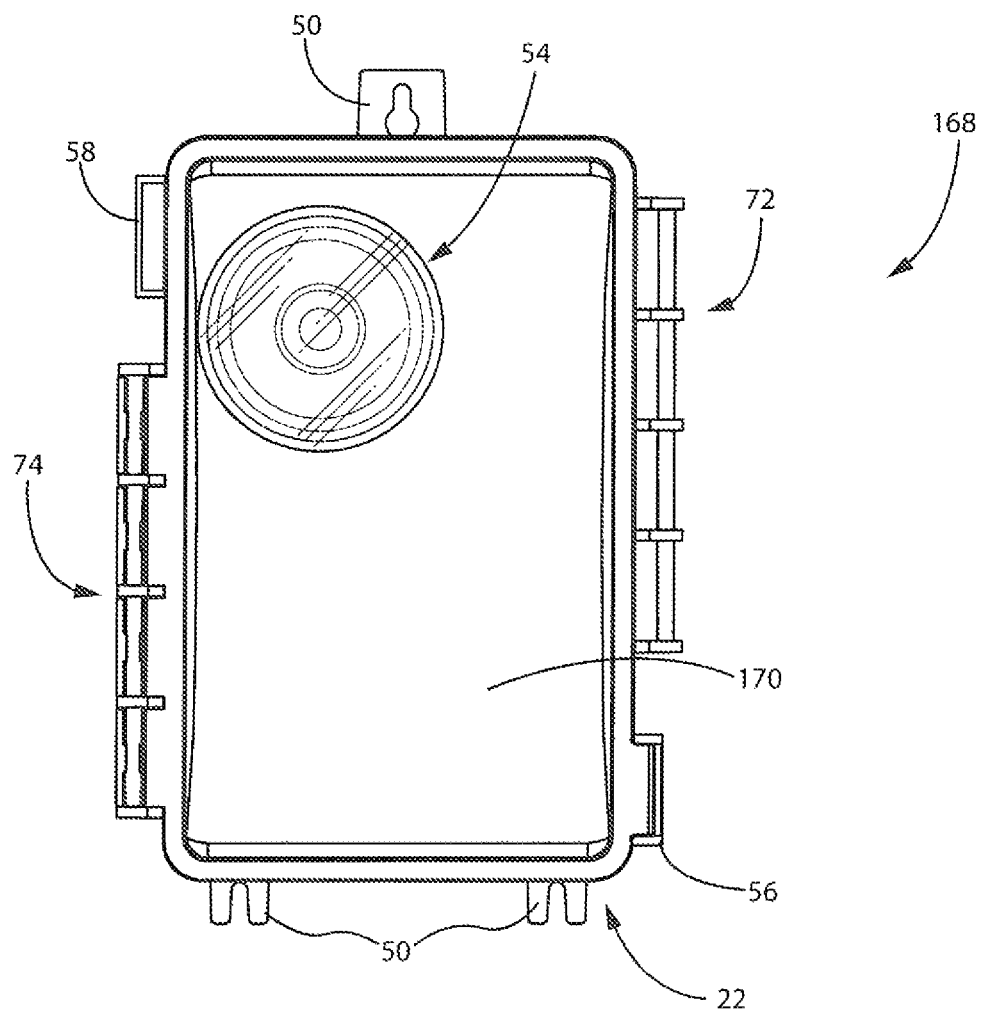
FIG. 13 is a front elevation view of an alternative embodiment of the weatherproof timer enclosure in accordance with the present invention show mg the weatherproof timer enclosure with a transparent lid.

FIG. 13 illustrates a weatherproof timer enclosure 168 in accordance with the present invention having a base 22 and a lid 170 with timer assembly 54 therein. In one implementation, the lid 170 is generally clear, translucent or transparent to provide visual access to the timer assembly 54. In one implementation, all of the lid 170 is composed of a transparent material, such as plastic. In another implementation, only a portion of the lid 170 is composed of a transparent material and the remaining portions of the lid are metal or any other non-transparent material, as shown. Still further, the non-transparent sections may be plastic, sheet metal, or any other suitable material.

Figure 14C:
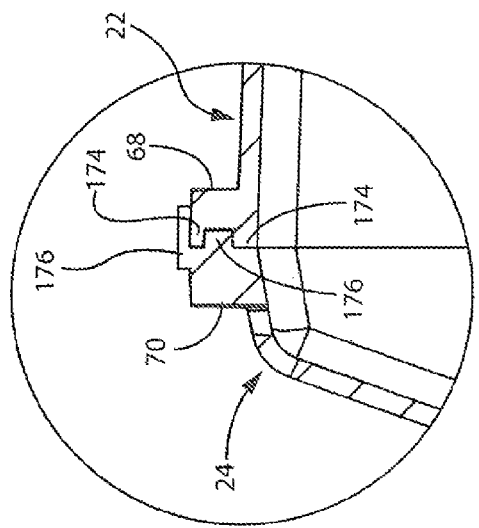
FIG. 14C is an enlarged partial view of the section labeled 14C in FIG. 14B showing the tortuous seal.
Figure 14B:
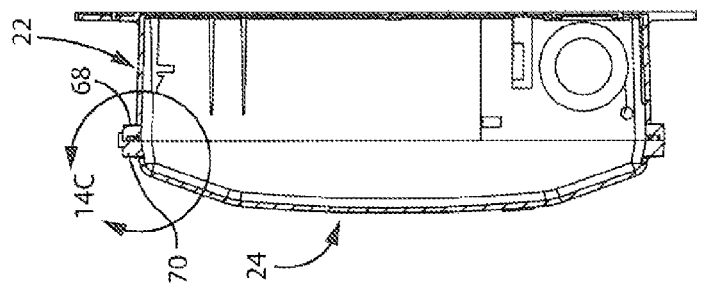
FIG. 14B is a side sectional view taken generally along line 14B-14B in FIG. 14A showing the tortuous seal between the base and the lid.
Figure 14A:
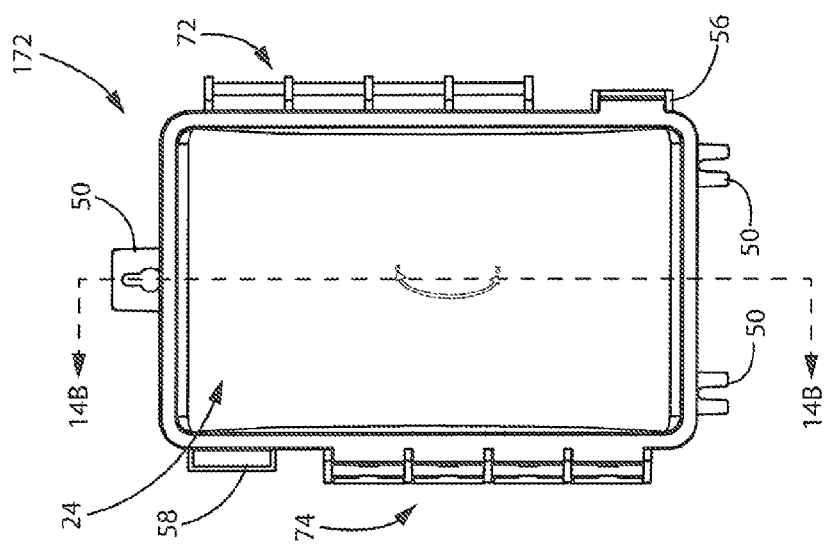
FIG. 14A is a front elevation view of an alternative embodiment of the weatherproof timer enclosure in accordance with the present invention showing the weatherproof timer enclosure with a tortuous seal between the base and the lid.

FIGS. 14A-14C illustrate a weatherproof timer enclosure 172 in accordance with the present invention having a base 22 and a lid 24. The base 22 includes a base sealing lip 68 and the lid 24 includes a lid sealing lip 70. The base sealing lip 68 may be formed so as to define a base serpentine or tortuous path 174 forming a generally U-shaped portion and the lid sealing lip 70 may be formed so as to define also a lid serpentine or tortuous path 176 also having a generally U-shaped portion. In one aspect, the tortuous paths 174 and 176 are positioned offset from one another such that the lid tortuous path 176 fits within the base tortuous path 174 or vice versa. Still further, a compressible seal composed of foam, rubber, or a similar gasket style or other resilient sealing material may be incorporated between the two tortuous paths and provide additional, sealing for the weatherproof timer enclosure 172. A person of skill in the art will readily recognize that it may not be necessary to incorporate a gasket or seal between the base 22 and the lid 24 if a tortuous path is incorporated, but may still be utilized. Finally, the tortuous paths 174 and 176 may extend completely around each of the base and lid and operate complimentary to one another regardless of the lid pivot orientation selected, whether the lid pivots from the left, right, top, or bottom.

Figure 15A:
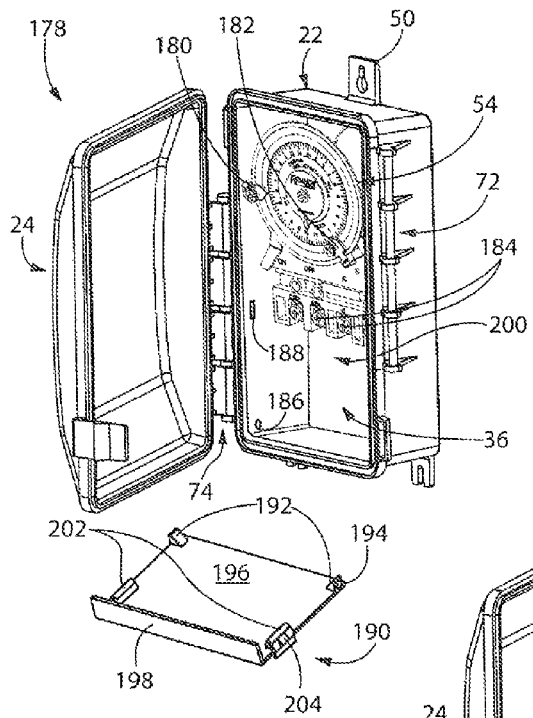
FIG. 15A is an isometric view of an alternative embodiment of the weatherproof timer enclosure in accordance with the present invention showing the weatherproof timer enclosure with a wiring lid removed from the base.
Figure 15B:
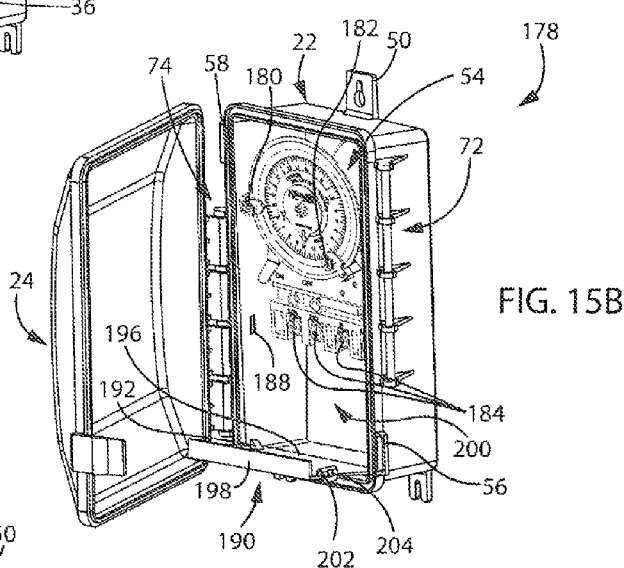
FIG. 15B is an isometric view of the weatherproof timer enclosure of FIG. 15A with the wiring lid attached to the base and the wiring lid substantially open.
Figure 15C:
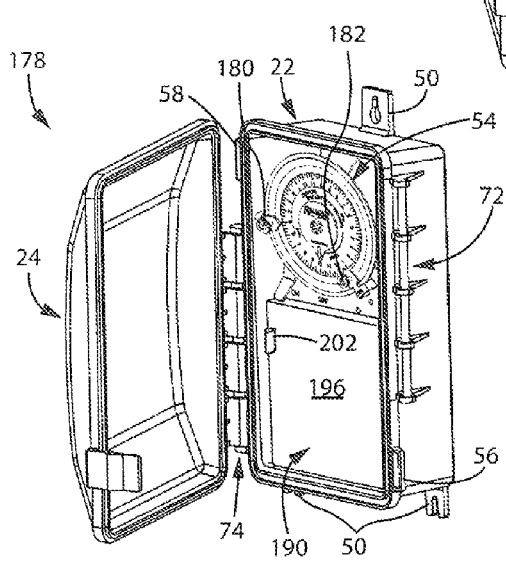
FIG. 15C is an isometric view of the weatherproof timer enclosure of FIG. 15A with the wiring lid attached to the base and the wiring lid in a closed position.

FIGS. 15A-C illustrate a weatherproof timer enclosure 178 in accordance with the present invention having a base 22 and a lid 24. The timer assembly 54 is positioned at least partially inside of the base 22 and may include an ON tripper 180 and an OFF tripper 182 which function to turn the power supply through the timer assembly 54 on and off when the appropriate time is reached as known in the art. In one implementation. ON tripper 180 may be green, while OFF tripper 182 may be red to visually indicate which tripper provides which function.

The base cavity 36 also includes wiring terminals 184 adjacent to the timer assembly 54 that are used to connect the electrical wires that come into the timer assembly 54 with the electrical wires that come out of the timer assembly 54. The base 22 may also include a pair of pivot apertures or indentations 186 on an inside surface of the base 22 and a pair of safety lock apertures or indentations 188 also positioned on an inside surface of the base 22. A wiring lid or cover 190 includes a pair of pivot mounts 192 having pivot pins or rods 194 which are arranged to fit within pivot indentations 186 of the base 22. The wiring lid 190 includes a front wall 196 and a top wall 198 which work together to limit or prevent access to a wiring cavity 200 below the wiring terminals 184. The wiring lid 190 also includes a pair of locks or tabs 202 with locking protrusions 204 thereon.

During installation, the wiring is fed into the weatherproof timer enclosure 178 and appropriately connected to the timer assembly 54 at the wiring terminals 184. The installer will then locate the wiring lid 190 so that the pivot pins 194 are positioned within pivot indentations 186 to allow the wiring lid 190 to pivot toward the installer and downward to provide access to the wiring terminals 184 and the wiring cavity 200 or upwards to limit or prevent access to the live electrical wires therein. Alternatively, the wiring lid 190 may be installed during initial manufacture of the weatherproof timer enclosure 178. The wiring lid 190 is pivoted upwards until the locking protrusions 204 of the safety locks 202 are positioned in the safety lock apertures 188, which functions to enclose the wiring cavity 200 and the wiring terminals 184. The user or installer can then access the wiring cavity 200 and the wiring terminals 184 by compressing the safety locks 202 towards one another to pull the respective locking protrusions 204 out of the safety lock apertures 188 and permit pivotal movement of the wiring lid 190. Accordingly, the wiring lid 190 significantly reduces the risk of inadvertently coming in contact with electrical wiring.

While FIGS. 15A-C only illustrate one implementation, the wiring lid 190 may pivot in any direction, including upward, downward, left, or right and may incorporate a keyed lock to further limit access to the wiring cavity 200. The wiring lid 190 may further pivot from any location on the base 22, including at the base hinges 72 or 74 such that the wiring lid 190 still pivots independently of the lid 24. The wiring lid 190 may also pivot from a position inside of the base 22 or any position outside of the base 22. Similar to previously discussed implementations, the lid 24 may be selectively hinged to any one of the sides of the base 22, and the base 22, lid 24, and wiring lid 190 may be composed of any suitable materials, including plastics or metals. The particular objects and implementations of the concepts disclosed herein may readily be modified by a person having ordinary skill in the art without departing from the spirit and scope of the disclosure to incorporate various bolts, screws, clips or other attachment mechanisms envisioned to secure the various components.

An another implementation, the lid 24 may be pivotably mounted to the base 22 along a corner of both the base and lid such that the lid 24 pivots at an angle instead of just vertically or just horizontally. The connection between the base 22 and the lid 24 may be configured such that the lid 24 is automatically closed by gravity regardless of the mounting orientation. In yet another implementation, a spring may be incorporated within the hinge between the base 22 and the lid 24 or incorporated therebetween to bias the lid in the closed position. Accordingly, the lid 24 will snap back to the closed position and remain closed until forcibly opened by a user.

Figure 16A:
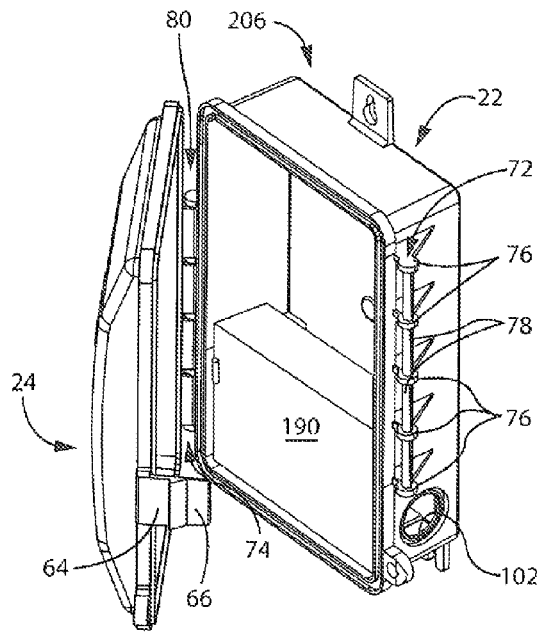
FIG. 16A is an isometric view of an alternative embodiment of the weatherproof timer enclosure in accordance with the present invention showing the weatherproof timer enclosure with a lid open and a locking tab unsecured.
Figure 16B:
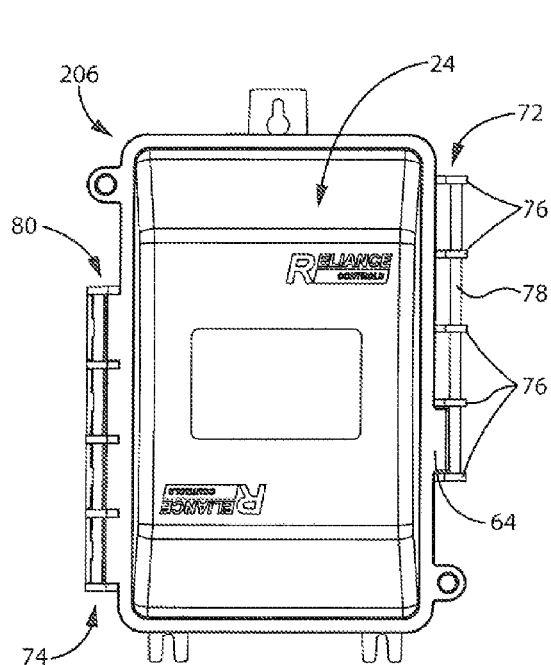
FIG. 16B is a front elevation view of the weatherproof timer enclosure of FIG. 16A with the lid closed and the locking tab secured in the hinge.
Figure 16C:
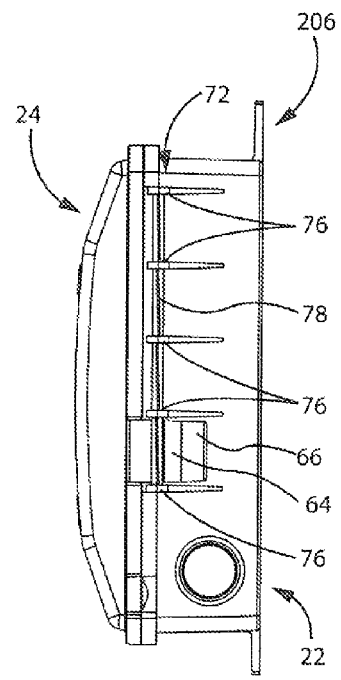
FIG. 16C is a side elevation view of the weatherproof timer enclosure of FIG. 16A with the lid closed and the locking tab secured in the hinge.
Figure 17A:
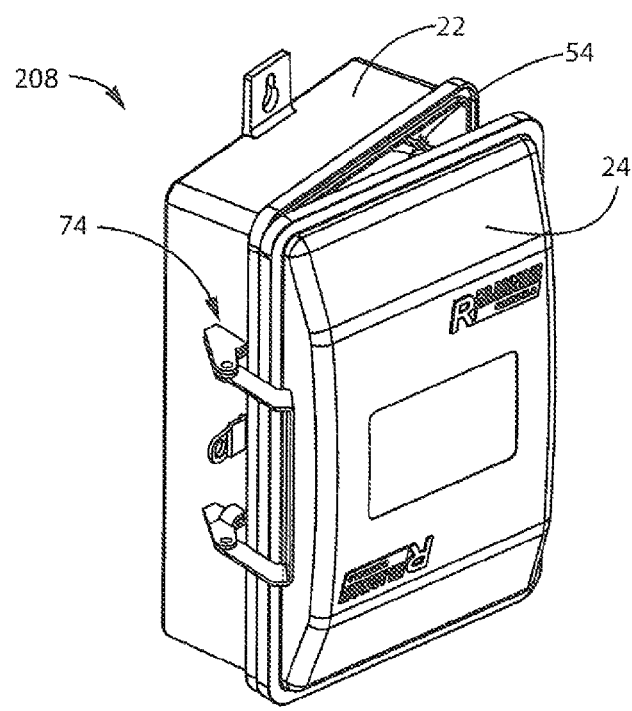
FIG. 17A is an isometric view of an alternative embodiment of the weatherproof tinier enclosure in accordance with the present invention showing the weatherproof timer enclosure having an alternative hinge subassembly and showing a lid open and hinged on a left side.
Figure 17B:
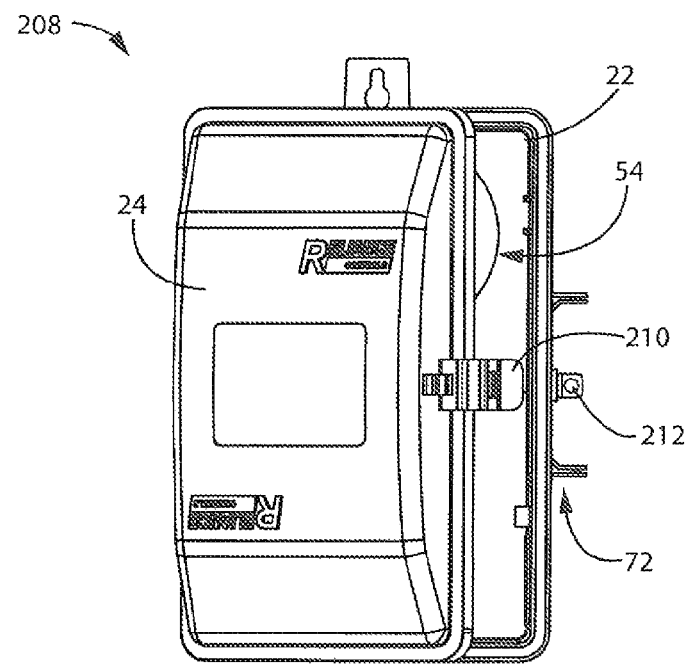
FIG. 17B is an isometric view of the weatherproof timer enclosure of FIG. 17A with the lid open and a locking latch separated from a locking tab.
Figure 18A:
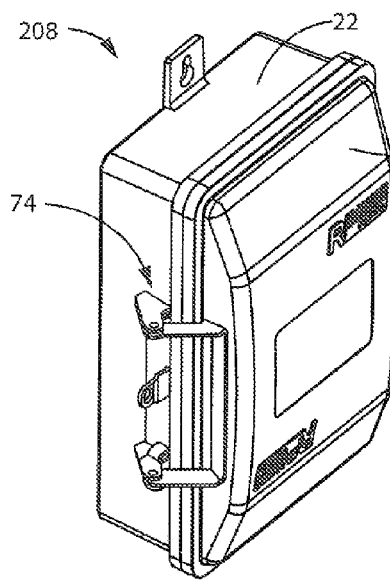
FIG. 18A is an isometric view of the weatherproof timer enclosure of FIG. 17A with the lid closed.
Figure 18B:
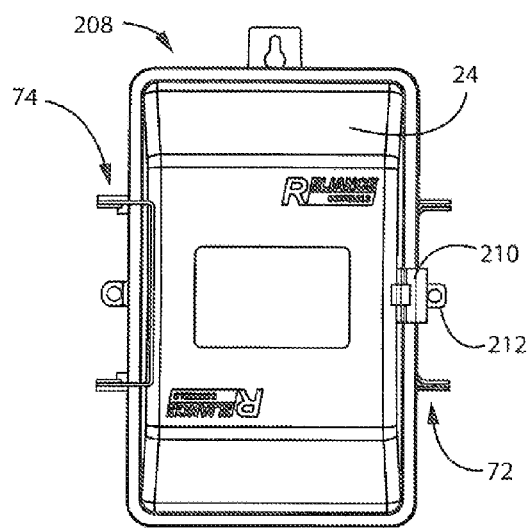
FIG. 18B is a front elevation view of the weatherproof timer enclosure of FIG. 18A with the lid closed and the locking latch secured to the locking tab.
Figure 18C:
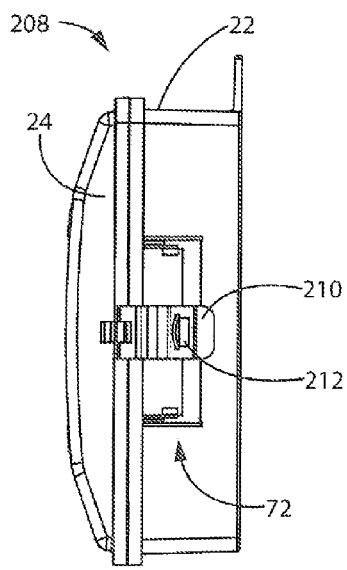
FIG. 18C is a side elevation view of the weatherproof timer enclosure of FIG. 18A with the lid closed and the locking latch secured to the locking tab.

FIGS. 16A through 16C illustrate another aspect of a weatherproof timer enclosure 206 in accordance with the present invention which may incorporate any number of features and components from earlier described aspects and implementations. The weatherproof timer enclosure 206 includes a base 22 and a lid 24 with the base 22 having hinges 72 and 74, each having hinge supports 76 and hinge connecting members 78 between adjacent hinge supports 76, as described previously. The lid 24 may include a closure member 64 having a closure member protrusion 66 arranged to be received between a lunge connecting member 78 and one of the walls of the base 22. Advantageously, this arrangement remedies the need for an additional base closure tab.

In operation, if the base 22 includes two base hinges 72 and 74, the base hinge not used for pivotably mounting the lid 24 may be used to secure the lid 24 in the closed position when the closure member 64 and the closure member protrusion 66 come in contact with the hinge connecting members 78. In one aspect, when the lid 24 pivots from the hinge 74, the lowest connecting member 78 on the right side is used to receive the closure member 64 and the closure member protrusion 66. When the lid 24 pivots from the hinge 72, the highest connecting member 78 on the left side is used to receive the closure member 64 and the closure member protrusion 66 since the lid 24 is rotated 180 degrees before being secured to the hinge 72. Accordingly, it is seen that any number of previously disclosed features may be incorporated while removing a closure tab from the base 22 to further reduce costs and size of the weatherproof timer enclosure.

FIG. 17A through FIG. 18C illustrate a weatherproof timer enclosure 208 in accordance with the present invention having a base 22 and a lid 24. The base 22 and lid 24 are selectively connectable at a left hinge 74 or a right hinge 72. The base 22 or lid 24 may also include a locking latch 210 securable over a locking tab 212. The remaining features of the weatherproof timer enclosure 208 are similar to previously disclosed aspects and implementations and may include any of the features as may be appropriate.

Hinges 72 and 74 are slightly modified from the other aspects and may include plastic, metal or sheet metal components extending from both the base 22 and the lid 24 to selectively mount the lid 24 to the base 22. Once the lid 24 is closed, locking latch 210 is rotated to surround the locking tab 212. At this point, a lock or other removable securing mechanism may be inserted through the locking tab 212 to prevent the lid 24 from being opened. Specifically the arrangement with the locking latch 210 and the locking tab 212 prevents the locking latch 210 from becoming unlocked. Further, hinge arrangements which would otherwise permit access into the base 22 are unable to be opened when the locking latch 210 is secured since the locking latch is in direct contact with both the base 22 and the lid 24. Accordingly, the locking latch 210 may be incorporated into any of the previously disclosed aspects and implementations to further limit access to the weatherproof timer when the lid is in the closed position.

It can thus be appreciated that the present invention contemplates a number of features that may be incorporated in an enclosure, such as for use in combination with a timer. The various features of the present invention as disclosed herein may be used alone independently of each other, or in various combinations and some combinations as desired.

It should be understood that the invention is not limited in its application to the details of construction and arrangements of the components set forth herein. The invention is capable of other embodiments and of being, practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A weatherproof timer assembly comprising:
   a housing comprising a base having a plurality of sidewalls and a rear wall, the base sidewalls extending forward from the rear wall to an open front, and wherein the base sidewalls include at least two hinge members, wherein the at least two hinge members are positioned on parallel ones of the base sidewalls;
   a serpentine path along a sealing point between the base and the lid; and
   a timer assembly positioned within the base.

2. The weatherproof timer assembly of claim 1 further comprising a releasable locking tab on the lid to engage a locking slot in the base.

3. The weatherproof timer assembly of claim 1 wherein the lid is removable and replaceable in at least two different orientations.

4. The weatherproof timer assembly of claim 1 further comprising a wiring cavity in the base and a wiring cavity lid operable to enclose wiring between the base and the wiring cavity lid.

5. The weatherproof timer assembly of claim 4 wherein a plurality of wiring terminals are positioned within the wiring cavity and are inaccessible when the wiring cavity is closed by the wiring cavity lid.

6. The weatherproof timer assembly of claim 1 further comprising at least one removable pin connecting the base and the lid.

7. The weatherproof timer assembly of claim 6 wherein the lid is capable of being oriented on the base in at least two orientations.

8. The weatherproof timer assembly of claim 1 wherein the base further comprises a removable insert and the removable insert is the base rear wall.

9. The weatherproof timer assembly of claim 8 wherein the insert is replaceable.

10. The weatherproof timer assembly of claim 1 wherein the base sidewalls further comprise a plurality of removable plugs in a plurality of apertures for receiving electrical wiring through the plurality of apertures.

11. The weatherproof timer assembly of claim 10 wherein the removable plugs are selectively replaceable.

12. The weatherproof timer assembly of claim 1 further comprising a lever extending through the lid and operating a user override power switch.

13. The weatherproof timer assembly of claim 1 wherein the timer assembly is visible when the lid is in a closed position.

14. The weatherproof timer assembly of claim 13 wherein the lid is at least partially composed of a transparent material that provides visual access to the timer assembly.

15. A weatherproof timer assembly comprising:
- a housing comprising a base having a plurality of sidewalls and a rear wall, the base sidewalls extending forward from the rear wall to an open front;
- a lid having a plurality of sidewalls and a front wall, the lid sidewalls extending rearward from the front wall wherein the lid is selectively pivotably secured to the base along one of the base sidewalls;
- a releasable locking tab on the lid to engage a locking slot in the base, wherein the lid is selectively removable along two parallel base sidewalls in a first orientation and in a second orientation, and wherein the releasable locking tab engages the locking slot in either the first or second orientation;
- a serpentine path along a sealing point between the base and the lid; and
- a timer assembly positioned within the base.

16. The weatherproof timer assembly of claim 15 wherein the base sidewalls further comprise a hinge member on at least one base sidewall.

17. The weatherproof timer assembly of claim 16 wherein the hinge member is at least two hinge members.

18. A weatherproof timer assembly comprising:
- a housing comprising a base having a plurality of sidewalls and a rear wall, the base sidewalls extending forward from the rear wall to an open front;
- a lid having a plurality of sidewalls and a front wall, the lid sidewalls extending rearward from the front wall wherein the lid is selectively pivotably secured to the base along one of the base sidewalls;
- a serpentine path along a sealing point between the base and the lid; and
- a timer assembly positioned within the base;
- wherein the base further comprises at least two hinge members, each of the at least two hinge members positioned on different parallel ones of the base sidewalls, and wherein the lid further comprises at least one hinge member selectively securable to either of the at least two base hinge members.

19. The weatherproof timer assembly of claim 18 wherein one of the at least two base hinge members is a non-connected hinge member and is not connected to the lid at least one hinge member, and wherein the non-connected hinge member is removable from the base.

20. The weatherproof timer assembly of claim 18 wherein the lid is removable from one of the at least two base hinge members and is rotated 180 degrees to attach the lid to the base at the other of the at least two base hinge members.

\* \* \* \* \*